United States Patent [19]

Eden et al.

[11] Patent Number: 4,599,730
[45] Date of Patent: Jul. 8, 1986

[54] VISIBLE AND ULTRAVIOLET LASERS BASED ON EXCIMER TRANSITIONS IN THE HOMONUCLEAR HALOGENS

[75] Inventors: James G. Eden, Champaign; Kevin P. Killeen, Urbana, both of Ill.

[73] Assignee: The United States of America as represented by the Secretary of the Navy, Washington, D.C.

[21] Appl. No.: 656,814

[22] Filed: Oct. 1, 1984

[51] Int. Cl.$^4$ .................................................. H01S 3/22
[52] U.S. Cl. ......................................... 372/57; 372/60; 372/74; 372/5
[58] Field of Search ........................ 372/57–59, 372/55, 5, 74, 60, 68, 20; 330/4.5

[56] References Cited

U.S. PATENT DOCUMENTS

| | | | |
|---|---|---|---|
| 4,228,408 | 10/1980 | Schmitschek et al. | 331/94.5 G |
| 4,229,711 | 10/1980 | Schmitschek et al. | 331/94.5 P |
| 4,258,334 | 3/1981 | McCusker et al. | 331/94.5 G |
| 4,301,425 | 11/1981 | Sze | 372/57 |
| 4,317,087 | 2/1982 | Sander et al. | 372/57 |
| 4,318,060 | 3/1982 | Davis | 372/70 |
| 4,331,937 | 5/1982 | Braun et al. | 372/57 |
| 4,334,199 | 6/1982 | Ham | 372/57 |
| 4,340,968 | 7/1982 | Willis et al. | 372/57 |
| 4,348,647 | 9/1982 | Nighan et al. | 372/57 |

OTHER PUBLICATIONS

Swingte et al., "Photolytic Pumping of the Iodine Laser by XeBr", Appl. Phys. Lett., vol. 28, No. 7, Apr. 1, 1976.

Forestier et al., "Suspersonic Flow Low Temperature Electronic Transition Excimer Lasers"; Jour de Physique; Colloque C9, Supplement au No. 11, Tome 41, Nov. 198, pp. C9–455.

Primary Examiner—Léon Scott, Jr.
Attorney, Agent, or Firm—R. F. Beers; H. A. David

[57] ABSTRACT

Visible and ultraviolet lasers is based on excimer transitions in the diatomic homonuclear halogen molecules. Electron beam pumping of argon and hydrogen iodide gas mixtures produces a strong green emission in $I_2$ centered at 505 nm and a full width of half maximum (FWHM) of the gain spectrum of approximately 15 nm. The transition for the green $I_2$ band is bound-to-free, so a laser on this transition is continuously tunable. The result is a room temperature excimer laser that is potentially tunable over a region of 150 Å in the blue-green.

9 Claims, 3 Drawing Figures

VISIBLE AND ULTRAVIOLET LASERS BASED ON EXCIMER TRANSITIONS IN THE HOMONUCLEAR HALOGENS

BACKGROUND OF THE INVENTION

1. Field of the Invention.

The present invention relates to visible and ultraviolet lasers, and more particularly to visible and ultraviolet lasers based on excimer transitions in the diatomic homonuclear halogen molecules.

2. Description of the Prior Art.

The well-known molecular iodine ($I_2$) ultraviolet laser at 342 nm arises from the D' (1.432, $^3\pi_{2g}$) to A' (2431, $^3\pi_{2u}$) transition of the $I_2$ molecule. This laser has been pumped by both electron beam and optical excitation. The latter excitation is possible because the $I_2$ absorption band centered near 190 nm results in the production of excited $D^1\Sigma_u{}^+$ molecules. In the presence of a buffer gas these molecules collisionally relax to the lowest lying ion-pair state, $D'^3\pi_{2g}$, which is the upper energy level for the ultraviolet laser. Both the spontaneous emission and laser spectra for the D' to A' band exhibit well-developed vibrational structure since the transition is bound to bound. Output energies up to 13 Joules from an optically pumped $I_2$ laser have been reported. Such lasers are not tunable, and lase in a portion of the spectrum where others, more efficient lasers, such as ZeF, exist.

SUMMARY OF THE INVENTION

Accordingly, the present invention provides visible and ultraviolet lasers based on excimer transitions in the diatomic homonuclear halogen molecules. Electron beam pumping of argon and hydrogen iodide gas mixtures produces a strong green emission in $I_2$ centered at 505 nm and a full width at half maximum (FWHM) of the gain spectrum of approximately 15 nm. The transition for the green $I_2$ band is bound-to-free, so a laser on this transition is continuously tunable. The result is a room temperature excimer laser that is potentially tunable over a region of 150 Å in the blue-green.

Therefore, it is an object of the present invention to provide a visible and ultraviolet lasers based on excimer transitions in the diatomic homonuclear halogen molecules which are continuously tunable and operate at room temperature.

Other objects, advantages and novel features will be apparent from the following detailed description when read in conjunction with the appended claims and attached drawing.

DESCRIPTION OF THE PREFERRED EMBODIMENT

Figure 1:
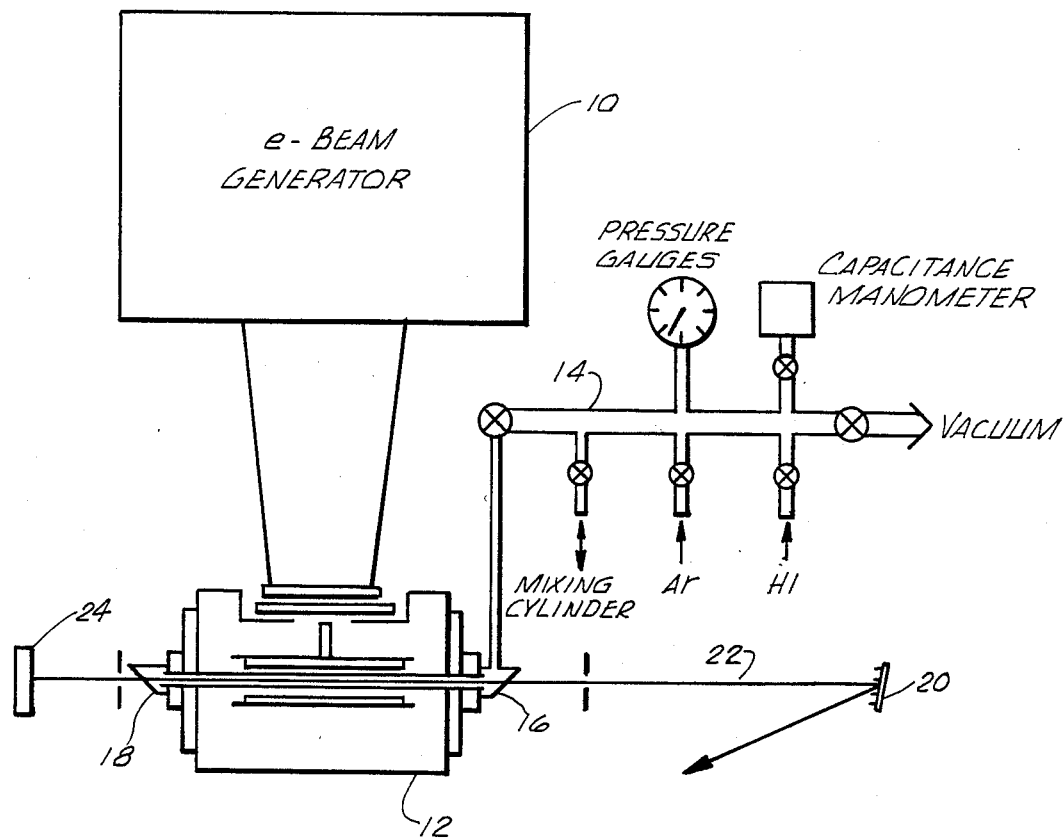
FIG. 1 is a schematic diagram of an excimer laser according to the present invention.
Figure 2:
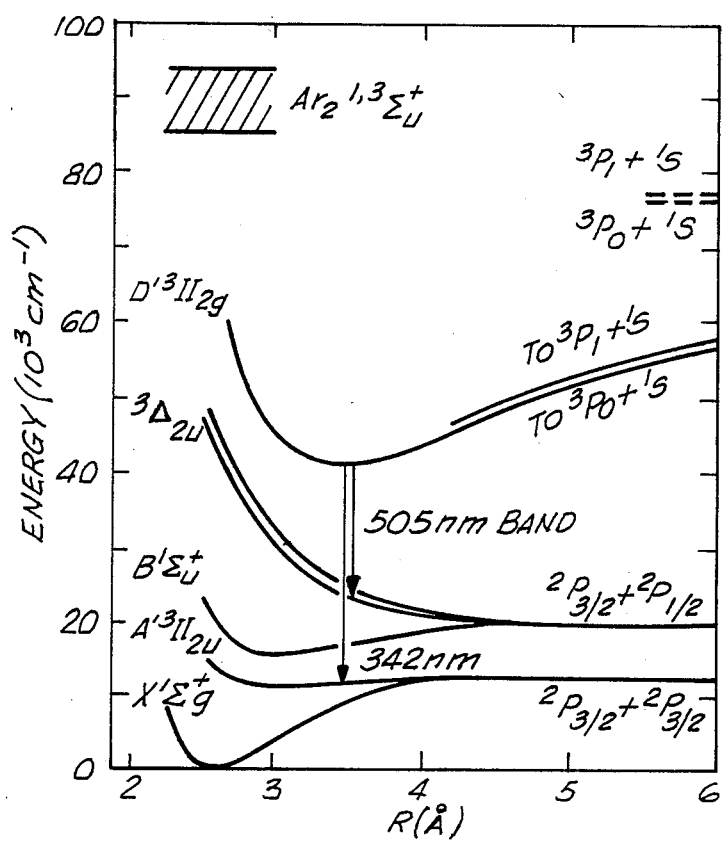
FIG. 2 is a partial energy-level diagram for molecular iodine.

Referring now to FIG. 1 an e-beam generator 10 delivers pulses to the cathode of a coaxial diode 12. A rare gas and a halogen donor molecular gas, such as argon and hydrogen iodide, respectively, are premixed in a mixing cylinder via a common manifold 14. Brewster angle windows 16 and 18 are situated at either end of the coaxial diode 12, one of which serves as a means for introducing the gases from the mixing cylinder to the interior of the anode of the coaxial diode. A tuning and reflecting means 20, such as a diffraction grating or Littrow prism, is situated for wavelength selective reflection of the laser beam 22. A broadband ouput coupler 24, reflective in the visible and ultra-violet regions, serves to complete the optical cavity. The partial energy-level diagram of FIG. 2 shows the well-known D' to A' transition for the molecular iodine ultraviolet laser at 342 nm. However, there is another transition which does not share the same upper state as the 342 nm band, but which terminates on the $^3\pi_{2u}$ level, producing a visible spectrum in the green region centered at approximately 505 nm. This transition is bound-to-free.

Figure 3:
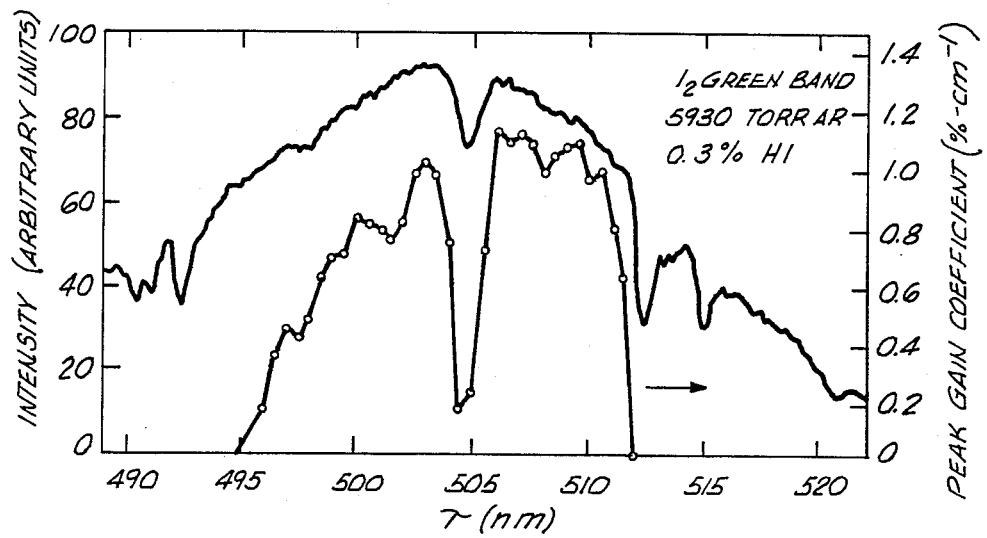
FIG. 3 is a fluorescence emission spectrum for the excimer laser of FIG. 1.

In operation passivation of the system is accomplished by allowing 100 Torr of HI to stand in the manifold 14, mixing cylinder and anode of the coaxial diode 12 for 24 hours. Then the HI is mixed with 5930 Torr of Ar, the concentration of HI being 0.3%. The e-beam generator 10 delivers 3 ns, 600 kV pulses to the cathode of the coaxial diode 12. The resulting flourescence emission spectrum of the green transition is shown in FIG. 3. Under these conditions the UV band superflouresces and, thus, has the effect of reducing the peak gain coefficient for the green transition. To maximize the gain on the 505 nm band a gas, such as chlorine, which absorbs heavily at the UV wavelength (but not in the green) is introduced, resulting in a potential gain increase of an order of magnitude.

The analogous band in bromine, using 0.2% concentration of hydrogen bromide in 6000 Torr of Argon, has been observed with an emission peak near 358 nm in addition to the strong D' to A' fluorescence at 292 nm. Thus, a family of excimer lasers using the diatomic homonuclear halogen molecules ($I_2$, $Br_2$, $Cl_2$ and $F_2$) is possible with wavelengths extending from the green well into the ultraviolet. Additionally it is possible to excite these lasers in existing rare gas-halide (RGH) laser discharge devices which are constructed of materials well suited for all the halogens. In lieu of the c-beam generator an ultraviolet-preionized, transverse atmospheric discharge device may be used. Other halogen-donor molecular gases include $CF_3I, CBr_4, CF_3Br, CF_2I_2$ and the like. Therefore, present laser systems may operate at these new wavelengths.

Thus, the present invention provides a family of excimer lasers using diatomic homonuclear halogen molecules with wavelengths from the green well into the ultraviolet. An absorber gas also is introduced to minimize interference by the superflourescing D' to A' bands in order to maximize the gain at these new wavelengths.

What is claimed is:

1. An excimer laser including:
    a gas mixture of a halogen-donor modecular gas and an inert gas at room temperature and ambient pressure; and
    means for exciting said gas mixture to produce a flourescence emission spectrum having a tunable bandwidth an absorber gas added to said gas mixture to absorb a competing D' to A' emission transition which tends to reduce gain associated with said flourescence emission spectrum.

2. An excimer laser as recited in claim 1 wherein said gas mixture comprises an approximately 0.3% concentration of hydrogen iodide in 5930 Torr of argon to produce said flourescence emission spectrum and laser radiation in green wavelengths centered at approximately 505 nm.

3. An excimer laser as recited in claim 2 wherein said absorber gas comprises chlorine to absorb said competing transition in the ultraviolet band, enhancing the gain of said flourescence emission spectrum in the green wavelengths.

4. An excimer laser as recited in claim 1 wherein said gas mixture comprises an approximately 0.3% concentration of hydrogen iodide in 5930 Torr of argon to produce said flourescence emission spectrum and laser radiation in the green wavelengths centered at approximately 505 nm.

5. An excimer laser as recited in claim 4 wherein said exciting means comprises an electron-beam pumped device.

6. An excimer laser as recited in claim 4 wherein said exciting means comprises an ultraviolet-preionized, transverse atmospheric discharge device.

7. An excimer laser as recited in claim 1 wherein said gas mixture comprises an approximately 0.2% concentration of hydrogen bromide in approximately 6000 Torr of argon to produce said fluorescence emission spectrum in the ultraviolet wavelengths centered at approximately 358 nm.

8. An excimer laser as recited in claim 1 wherein said halogen-donor molecular gas is selected from the group consisting of HI, $CF_3I$, $CBr_4$, HBr, $CF_3Br$ and $CF_2I_2$.

9. An excimer laser as in claim 1 wherein said room temperature excimer laser is tunable over a range of 150 Å.

* * * * *